(12) United States Patent
Imes (10) Patent No.: US 12,418,471 B2
(45) Date of Patent: Sep. 16, 2025

(54) NETWORK DEVICE AND METHOD WITH BYPASS CAPABILITY

(71) Applicant: Johnson Controls Tyco IP Holdings LLP, Milwaukee, WI (US)

(72) Inventor: Ezra M. Imes, Pewaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 372 days.

(21) Appl. No.: 17/941,869

(22) Filed: Sep. 9, 2022

(65) Prior Publication Data

US 2024/0089193 A1 Mar. 14, 2024

(51) Int. Cl.
*H04L 45/00* (2022.01)
*H04L 45/28* (2022.01)

(52) U.S. Cl.
CPC .............. *H04L 45/22* (2013.01); *H04L 45/28* (2013.01)

(58) Field of Classification Search
CPC ................................ H04L 45/22; H04L 45/28
USPC ......................................................... 370/217
See application file for complete search history.

(56) References Cited

U.S. PATENT DOCUMENTS

| 2008/0031270 | A1* | 2/2008 | Tran | ...................... | H04L 49/352 |
| | | | | | 370/419 |
| 2010/0311488 | A1* | 12/2010 | Miller | ....................... | A63F 1/12 |
| | | | | | 463/31 |
| 2010/0311502 | A1* | 12/2010 | Miller | ....................... | A63F 1/02 |
| | | | | | 463/30 |
| 2017/0357607 | A1 | 12/2017 | Cayemberg et al. | | |
| 2023/0125152 | A1* | 4/2023 | Eriksen | .................. | H01H 71/04 |
| | | | | | 361/42 |
| 2023/0360851 | A1* | 11/2023 | Rooyakkers | .......... | G06F 13/364 |

FOREIGN PATENT DOCUMENTS

| CN | 1337050 A | * | 2/2002 | ........... | H01H 13/023 |
| CN | 87202961 U | * | 11/2020 | | |
| EP | 1936885 B1 | * | 9/2010 | ........... | H04L 49/352 |
| JP | 2015505440 A | * | 12/2012 | | |

* cited by examiner

*Primary Examiner* — Khaled M Kassim
*Assistant Examiner* — Oladiran Gideon Olaleye
(74) *Attorney, Agent, or Firm* — Foley & Lardner LLP (57) ABSTRACT

A system for a building includes a device includes a first and second connector. The device also includes a switch having a first, a second, and a third port. The first connector is coupled to the first port of the switch and the second connector is coupled to the second port of the switch. The device also includes a controller that causes the first port to be coupled to the second port when the switch is not involved in communication between the first and second ports and the third port. When the switch is involved in communication between the first and second ports, the first port and the second port are each coupled to the third port, and the third port is coupled to the controller.

20 Claims, 8 Drawing Sheets

NETWORK DEVICE AND METHOD WITH BYPASS CAPABILITY

BACKGROUND

The present disclosure relates generally to networks. The present disclosure relates more particularly to a bypass system or method for a network, such as an Ethernet network.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® or VERASYS® building controllers or other devices sold by Johnson Controls, Inc., as well as building devices and components from other sources.

A BMS often utilizes a network (e.g., an Ethernet network, a Lon works Network, a building automation and control network (BACnet)) for communications. Networks often communicate by passing messages through one or more intermediate devices between the source device and the destination device. If an intermediate device fails or is powered off, the communication chain can be broken.

SUMMARY OF THE INVENTION

One embodiment of the present disclosure relates to a building system of a building. The building system includes a building controller configured to operate one or more pieces of building equipment of the building. The building system further includes controllers connected to Ethernet, where the controllers are configured in a daisy chain with bypass capability to prevent a loss of function in the event of a power failure.

In some embodiments, the building controller and the IP controller are separate units connected via one or more wires. In some embodiments, the controller contains Ethernet jacks, transformers, an Ethernet switch, and a microcontroller.

In some embodiments, the transformers are controlled by the microcontroller. In some other embodiments, magnetic circuits are placed between the Ethernet jacks and the microcontroller. The Ethernet jacks are coupled to the magnetic circuits.

In some embodiments, the magnetic circuits contain two circuits containing two transformers each. In other embodiments, the magnetic circuits contain four circuits containing two transformers each. In some embodiments, each circuit contains a second transformer that uses a half core. In some embodiments, the half core is made of a ferrous material. In some embodiments, a magnetic circuit uses one or more windings around a ferrous core, and the ferrous core switchable between one or more of the windings to achieve a by bypass operation.

In some embodiments, the half core can switch between communicating with a first wire coil and a second wire coil. The switch in communication is guided by whether a switching coil is in an on or off position. In some embodiments, when the switching coil is on, the magnetics behave with normal function and the half core interacts with the first wire coil. In some embodiments, the first wire coil is coupled to the Ethernet switch and microcontroller.

In other embodiments, when the switching coil is off, the half core interacts with the second wire coil. In some embodiments, the second wire coil is coupled to a wire coil in a second magnetics component that is connected to a second Ethernet jack.

According to various embodiments, a system for a building includes a device that includes a first and second connector. The device also includes a switch having a first, a second, and a third port. The first connector is coupled to the first port of the switch and the second connector is coupled to the second port of the switch. The device also includes a controller that causes the first port to be coupled to the second port when the switch is not involved in communication between the first and second ports and the third port. When the switch is involved in communication between the first and second ports, the first port and the second port are each coupled to the third port, and the third port is coupled to the controller.

In some embodiments, the switch includes a number of transformer circuits. Each circuit includes a primary coil that is coupled to the first connector or second connector, a first secondary coil that is coupled to the third port, and a second secondary coil that is coupled to a third secondary coil of another transformer circuit.

In some embodiments, the switch also includes a movable core that interacts with the first secondary coil when the switch is involved in communication between the first and second ports.

In some embodiments, the movable core interacts with the second secondary coil when the switch is not involved in communication between the first and second ports. In some embodiments, the movable core is moved by the controller. In some embodiments, the controller contains a plurality of magnetic circuits. In some embodiments, the switch comprises four transformers. In some embodiments, the first and second connectors are Ethernet jacks.

According to various embodiments, a method of bypassing a communication controller in a network of devices includes moving a core of a transformer to a first position when a first device is operational. When the core is in the first position, signals are communicated from a first connector through the first device to a second connector. The method also includes moving the core of the transformer to a second position when the first device is not operational. When the core is in the second position, the signals are communicated from the first connector to the second connector without reaching the first device.

In some embodiments, the core is biased to be in the second position and is moved to the first position by magnetism. In some embodiments, the transformer is enclosed in an Ethernet connector. In some embodiments, the transformer includes a first pair of transmit output conductors and two pairs of transmit input conductors. In some embodiments, the transformer includes a first pair of receive input conductors and two pairs of receive output conductors.

According to various embodiments, a communication switch for a network includes a first device and a second device. The communication switch includes a first magnetic circuit that includes a first transmit output that is configured to be coupled to a first connector, a first transmit input, and a second transmit input. The switch also includes a second magnetic circuit that includes a first receive input that is configured to be coupled to the first connector, a first receive output, and a second receive output. The switch also includes a third magnetic circuit that includes a second transmit output that is configured to be coupled to a second connector, a third transmit input, and a fourth transmit input, wherein the fourth transmit input is configured to be coupled to the second transmit input, the first transmit input and the third transmit input configured to be coupled to a controller. The switch also includes a fourth magnetic circuit that includes a second receive input that is configured to be coupled to the second connector, a third receive output, and a fourth receive output, wherein the fourth receive output is configured to be coupled to the second receive output, the first receive output and the third receive output configured to be coupled to the controller. In some embodiments, the first transmit output is configured to be coupled to the first transmit input and the first receive output is configured to be coupled to the first receive input in a first condition. The first transmit output is configured to be coupled to the second transmit input and the first receive input is configured to be coupled to the second receive output in a second condition.

In some embodiments, the second condition is a power loss in the controller. In some embodiments, the first transmit output and the first receive input are coupled to a first Ethernet jack. In some embodiments, the second transmit output and the second receive input are coupled to a second Ethernet jack. In some embodiments, the first, second, third, and fourth magnetic circuits each include a movable core. In some embodiments, the first, second, third, and fourth magnetic circuits each include a transformer with a movable core. In some embodiments, the communications switch is a three port Ethernet switch.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, a network (e.g., a network connected by a daisy chain, an Ethernet daisy chain) includes building controllers (e.g., building equipment such as air handling units, roof top units, zone controllers, thermostats, smart dampers, etc.) according to exemplary embodiments. Building controllers (e.g., configured as IP controllers) may be wired with Ethernet installation. By configuring Ethernet controllers in a daisy chain to have a bypass circuit, power failures do not shut down the function and communications other controllers on the network in some embodiments. For example, if one controller experiences a power failure, communications bypass that controller and the communications use the next controller that is functioning normally.

In some embodiments, the controllers include a switch unit that includes a magnetic circuit for providing bypass operations. The magnetic circuit includes a transformer with a movable coil in some embodiments. The switch unit includes two ports associated with connectors to the network and one port coupled to a microcontroller or communications control circuit of the controller. The bypass circuit connects the two ports when the controller is inoperable (e.g., due to power loss).

Building and HVAC System

Figure 1:
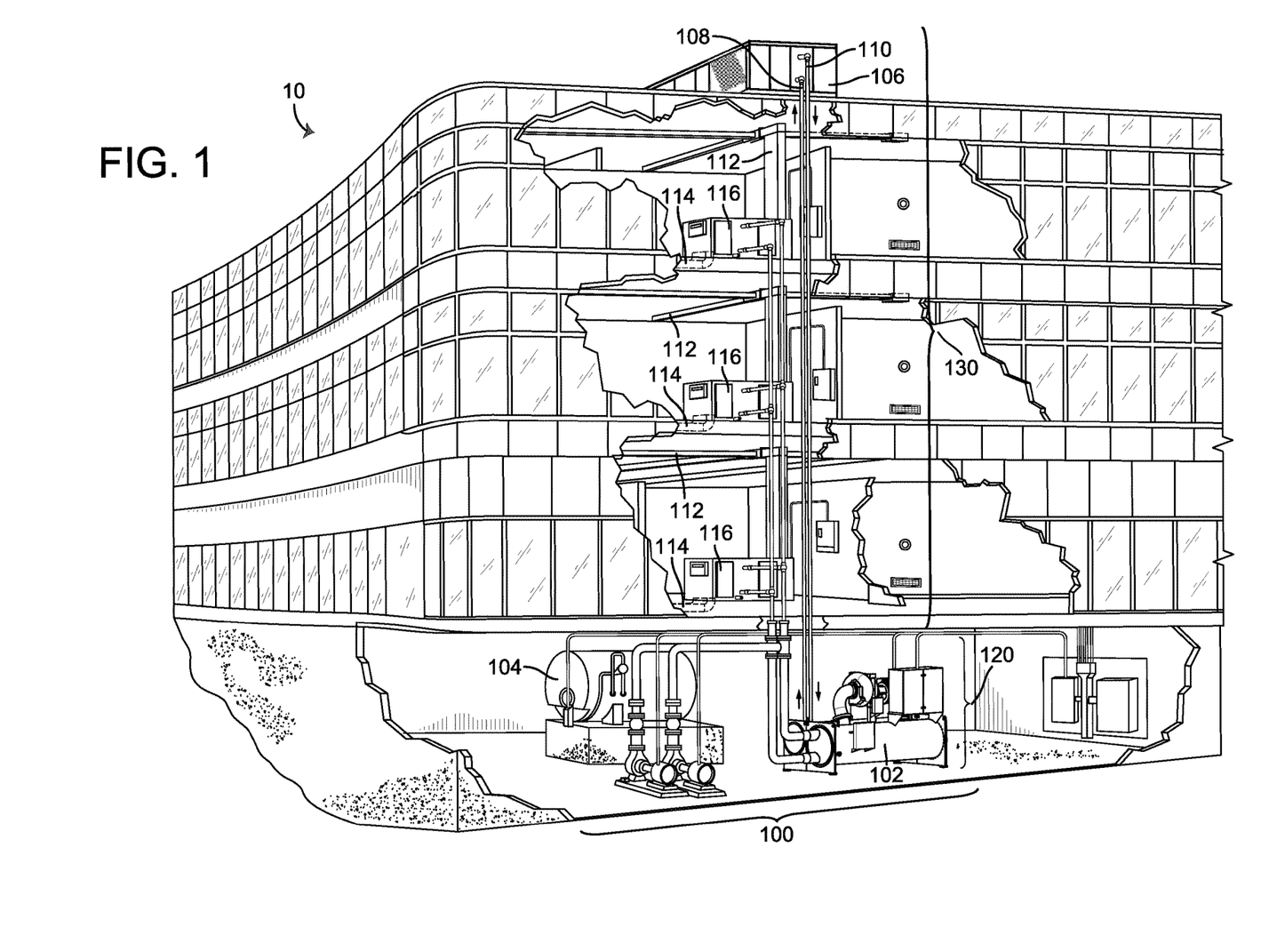
FIG. 1 is a schematic drawing of a building equipped with a heating, ventilating, and air conditioning (HVAC) system, according to an exemplary embodiment.

Referring now to FIG. 1, an exemplary building and HVAC system in which the systems and methods of the present invention can be implemented are shown, according to an exemplary embodiment. In FIG. 1, a perspective view of a building 10 is shown. Building 10 is served by a HVAC system 100. HVAC system 100 can include HVAC devices (e.g., heaters, chillers, air handling units, pumps, fans, thermal energy storage, etc.) configured to provide heating, cooling, ventilation, or other services for building 10. The HVAC devices can be coupled together via a network as described below. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Building Management System

Figure 2:
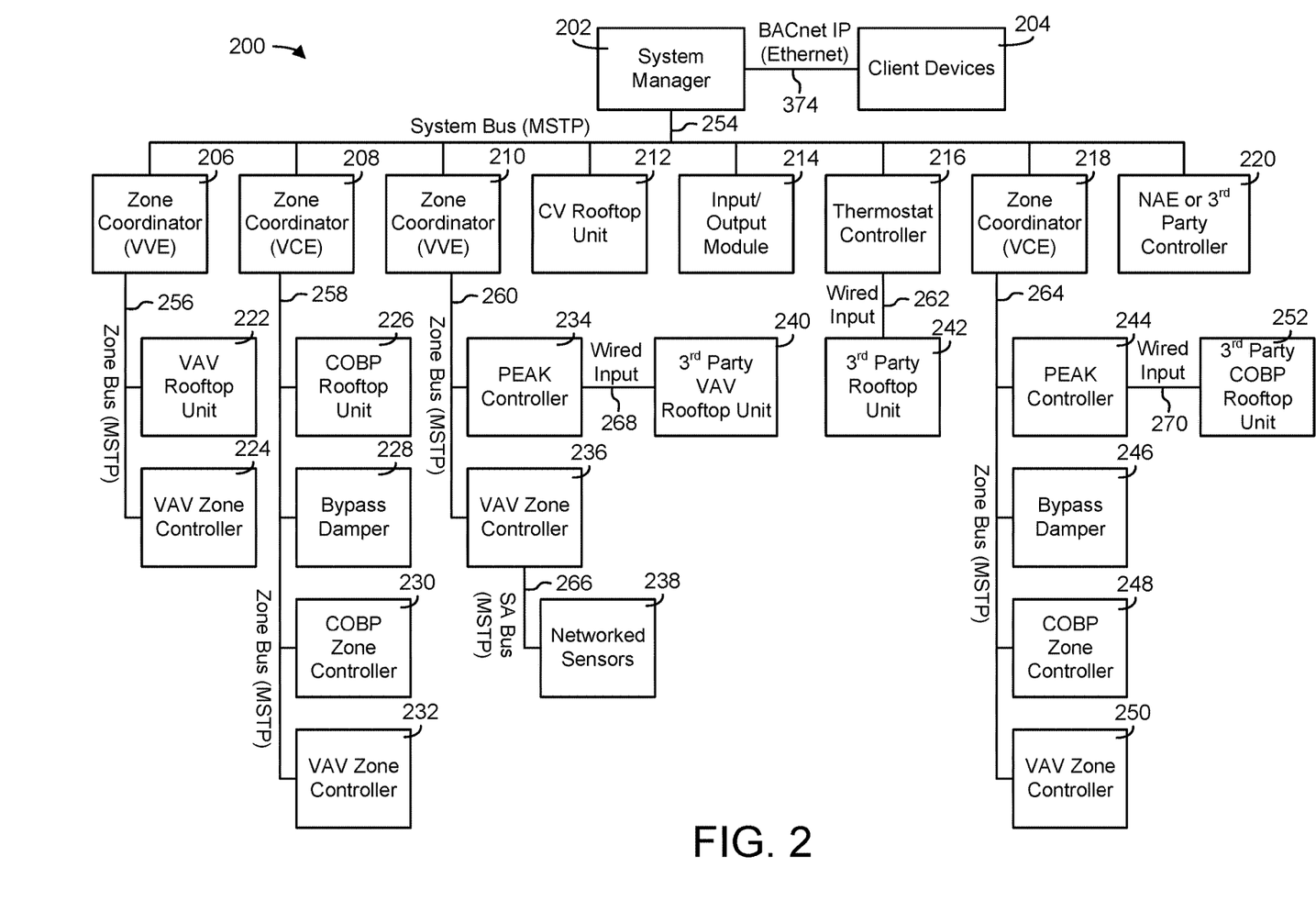
FIG. 2 is a block diagram of a building management system (BMS) which can be used to monitor and control the building and HVAC system of FIG. 1, according to an exemplary embodiment.

Referring now to FIG. 2, a block diagram of a building management system (BMS) 200 is shown, according to an exemplary embodiment. A BMS is, in general, a system of devices configured to control, monitor, and manage equipment in or around a building or building area. A BMS 200 can include, for example, a HVAC system, a security system, a lighting system, and a fire alerting system, any other system that is capable of managing building functions or devices, or any combination thereof. BMS 200 can be used to monitor and control the devices of HVAC system 100 and/or airside system (e.g., HVAC equipment) as well as other types of BMS devices (e.g., lighting equipment, security equipment, etc.).

In brief overview, BMS 200 provides a system architecture that facilitates automatic equipment discovery and equipment model distribution. Equipment discovery can occur on multiple levels of BMS 200 across multiple different communications busses (e.g., a system bus 254, zone buses 256-260 and 264, sensor/actuator bus 266, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 200 can begin interacting with the new device (e.g., sending control signals, using data from the device) without user interaction.

Some devices in BMS 200 present themselves to the network using equipment models. An equipment model defines equipment object attributes, view definitions, schedules, trends, and the associated BACnet value objects (e.g., analog value, binary value, multistate value, etc.) that are used for integration with other systems. An equipment model for a device can include a collection of point objects that provide information about the device (e.g., device name, network address, model number, device type, etc.) and store present values of variables or parameters used by the device. For example, the equipment model can include point objects (e.g., standard BACnet point objects) that store the values of input variables accepted by the device (e.g., setpoint, control parameters, etc.), output variables provided by the device (e.g., temperature measurement, feedback signal, etc.), configuration parameters used by the device (e.g., operating mode, actuator stroke length, damper position, tuning parameters, etc.). The point objects in the equipment model can be mapped to variables or parameters stored within the device to expose those variables or parameters to external systems or devices.

Some devices in BMS 200 store their own equipment models. Other devices in BMS 200 have equipment models stored externally (e.g., within other devices). For example, a zone coordinator 208 can store the equipment model for a bypass damper 228. In some embodiments, zone coordinator 208 automatically creates the equipment model for bypass damper 228 or other devices on zone bus 258. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 2, BMS 200 is shown to include a system manager 202; several zone coordinators 206, 208, 210 and 218; and several zone controllers 224, 230, 232, 236, 248, and 250. System manager 202 can communicate with client devices 204 (e.g., user devices, desktop computers, laptop computers, mobile devices, etc.) via a data communications link 374 (e.g., BACnet IP, Ethernet, wired or wireless communications, etc.). System manager 202 can provide a user interface to client devices 204 via data communications link 374. The user interface may allow users to monitor and/or control BMS 200 via client devices 204.

In some embodiments, system manager 202 is connected with zone coordinators 206-210 and 218 via a system bus 254. System bus 254 can include any of a variety of communications hardware (e.g., wire, optical fiber, terminals, etc.) configured to facilitate communications between system manager and other devices connected to system bus 254. Throughout this disclosure, the devices connected to system bus 254 are referred to as system bus devices. System manager 202 can be configured to communicate with zone coordinators 206-210 and 218 via system bus 254 using a master-slave token passing (MSTP) protocol or any other communications protocol. System bus 254 can also connect system manager 202 with other devices such as a constant volume (CV) rooftop unit (RTU) 212, an input/output module (IOM) 214, a thermostat controller 216 (e.g., a TEC2000 series thermostat controller), and a network automation engine (NAE) or third-party controller 220. RTU 212 can be configured to communicate directly with system manager 202 and can be connected directly to system bus 254. Other RTUs can communicate with system manager 202 via an intermediate device. For example, a wired input 262 can connect a third-party RTU 242 to thermostat controller 216, which connects to system bus 254.

System manager 202 can provide a user interface for any device containing an equipment model. Devices such as zone coordinators 206-210 and 218 and thermostat controller 216 can provide their equipment models to system manager 202 via system bus 254. In some embodiments, system manager 202 automatically creates equipment models for connected devices that do not contain an equipment model (e.g., IOM 214, third party controller 220, etc.). For example, system manager 202 can create an equipment model for any device that responds to a device tree request. The equipment models created by system manager 202 can be stored within system manager 202. System manager 202 can then provide a user interface for devices that do not contain their own equipment models using the equipment models created by system manager 202. In some embodiments, system manager 202 stores a view definition for each type of equipment connected via system bus 254 and uses the stored view definition to generate a user interface for the equipment.

Each zone coordinator 206-210 and 218 can be connected with one or more of zone controllers 224, 230-232, 236, and 248-250 via zone buses 256, 258, 260, and 264. Zone busses 256, 258, 260, and 264 can include any of a variety of communications hardware (e.g., wire, optical fiber, terminals, etc.) configured to facilitate communications between a zone coordinator and other devices connected to the corresponding zone bus. Throughout this disclosure, the devices connected to zone busses 256, 258, 260, and 264 are referred to as zone bus devices. Zone coordinators 206-210 and 218 can communicate with zone controllers 224, 230-232, 236, and 248-250 via zone busses 256-260 and 264 using a MSTP protocol or any other communications protocol. Zone busses 256-260 and 264 can also connect zone coordinators 206-210 and 218 with other types of devices such as variable air volume (VAV) RTUs 222 and 240, changeover bypass (COBP) RTUs 226 and 252, bypass dampers 228 and 246, and PEAK controllers 234 and 244.

Zone coordinators 206-210 and 218 can be configured to monitor and command various zoning systems. In some embodiments, each zone coordinator 206-210 and 218 monitors and commands a separate zoning system and is connected to the zoning system via a separate zone bus. For example, zone coordinator 206 can be connected to VAV RTU 222 and zone controller 224 via zone bus 256. Zone coordinator 208 can be connected to COBP RTU 226, bypass damper 228, COBP zone controller 230, and VAV zone controller 232 via zone bus 258. Zone coordinator 210 can be connected to PEAK controller 234 and VAV zone controller 236 via zone bus 260. Zone coordinator 218 can be connected to PEAK controller 244, bypass damper 246, COBP zone controller 248, and VAV zone controller 250 via zone bus 264.

A single model of zone coordinator 206-210 and 218 can be configured to handle multiple different types of zoning systems (e.g., a VAV zoning system, a COBP zoning system, etc.). Each zoning system can include a RTU, one or more zone controllers, and/or a bypass damper. For example, zone coordinators 206 and 210 are shown as Verasys VAV engines (VVEs) connected to VAV RTUs 222 and 240, respectively. Zone coordinator 206 is connected directly to VAV RTU 222 via zone bus 256, whereas zone coordinator 210 is connected to a third-party VAV RTU 240 via a wired input 268 provided to PEAK controller 234. Zone coordinators 208 and 218 are shown as Verasys COBP engines (VCEs) connected to COBP RTUs 226 and 252, respectively. Zone coordinator 208 is connected directly to COBP RTU 226 via zone bus 258, whereas zone coordinator 218 is connected to a third-party COBP RTU 252 via a wired input 270 provided to PEAK controller 244.

Zone controllers 224, 230-232, 236, and 248-250 can communicate with individual BMS devices (e.g., sensors, actuators, etc.) via sensor/actuator (SA) busses. For example, VAV zone controller 236 is shown connected to networked sensors 238 via SA bus 266. Networked sensors 238 can include, for example, temperature sensors, humidity sensors, pressure sensors, lighting sensors, security sensors, or any other type of device configured to measure and/or provide an input to zone controller 236. Zone controller 236 can communicate with networked sensors 238 using a MSTP protocol or any other communications protocol. Although only one SA bus 266 is shown in FIG. 2, it should be understood that each zone controller 224, 230-232, 236, and 248-250 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 224, 230-232, 236, and 248-250 can be configured to monitor and control a different building zone. Zone controllers 224, 230-232, 236, and 248-250 can use the inputs and outputs provided via their SA busses to monitor and control various building zones. For example, a zone controller 236 can use a temperature input received from networked sensors 238 via SA bus 266 (e.g., a measured temperature of a building zone) as feedback in a temperature control algorithm. Zone controllers 224, 230-232, 236, and 248-250 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Figure 3:
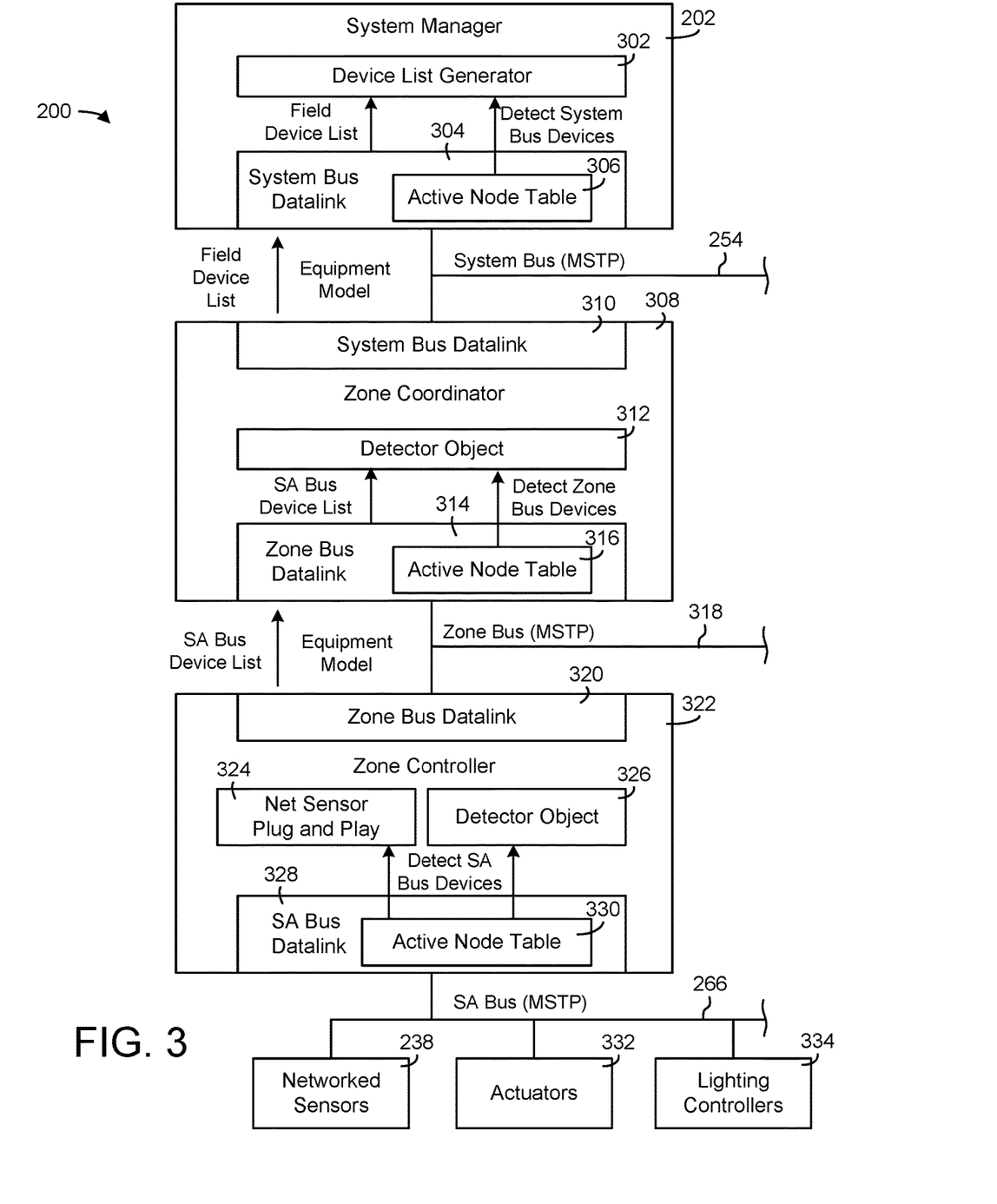
FIG. 3 is a block diagram illustrating a system manager, zone coordinator, and zone controller of the BMS of FIG. 2 in greater detail, according to an exemplary embodiment.

Referring now to FIG. 3, a block diagram illustrating a portion of BMS 200 in greater detail is shown, according to an exemplary embodiment. BMS 200 is shown to include system manager 202, a zone coordinator 308, and a zone controller 322. Zone coordinator 308 can be any of zone coordinators 206-210 or 218. Zone controller 322 can be any of zone controllers 224, 230, 232, 236, 248, or 250. Zone coordinator 308 can be connected with system manager via system bus 254. For example, system bus 254 is shown connecting a first system bus datalink 304 within system manager 202 with a second system bus datalink 310 within zone coordinator 308. Zone coordinator 308 can connected with zone controller 322 via a zone bus 318. For example, zone bus 318 is shown connecting a first zone bus datalink 314 within zone coordinator 308 with a second zone bus datalink 320 within zone controller 322. Zone bus 318 can be any of zone busses 256-260 or 264. Zone controller 322 is connected with networked sensors 238 and actuators 332 via a SA bus 266.

BMS 200 can automatically discover new equipment connected to any of system bus 254, zone bus 318, and SA bus 266. Advantageously, the equipment discovery can occur automatically (e.g., without user action) without requiring the equipment to be placed in discovery mode and without sending a discovery command to the equipment. In some embodiments, the automatic equipment discovery is based on active node tables for system bus 254, zone bus 318, and SA bus 266. Each active node table can provide status information for the devices communicating on a particular bus. For example, the active node table 306 for system bus 254 can indicate which MSTP devices are participating in the token ring used to exchange information via system bus 254. Active node table 306 can identify the devices communicating on system bus 254 by MAC address or other device identifier. Devices that do not participate in the token ring (e.g., MSTP slave devices) can be automatically discovered using a net sensor plug and play (described in greater detail below).

The active node table for each communications bus can be stored within one or more devices connected to the bus. For example, active node table 306 can be stored within system manager 202. In some embodiments, active node table 306 is part of a system bus datalink 304 (e.g., a MSTP datalink) used by system manager 202 to communicate via system bus 254. System manager 202 can subscribe to changes in value of active node table 306 and can receive a notification (e.g., from system bus datalink 304) when a change in active node table 306. In response to a notification that a change in active node table 306 has occurred, system manager 202 can read active node table 306 to detect and identify the devices connected to system bus 254.

In some embodiments, a device list generator 302 within system manager 202 generates a list of the devices connected to system bus 254 (i.e., a device list) based on active node table 306 and stores the device list within system manager 202. The device list generated by system manager 202 can include information about each device connected to system bus 254 (e.g., device type, device model, device ID, MAC address, device attributes, etc.). When a new device is detected on system bus 254, system manager 202 can automatically retrieve the equipment model from the device if the device stores its own equipment model. If the device does not store its own equipment model, system manager 202 can retrieve a list of point values provided by the device. System manager 202 can then use the equipment model and/or list of point values to present information about the connected system bus devices to a user.

The active node tables for each zone bus can be stored within the zone coordinator connected to the zone bus. For example, the active node table 316 for zone bus 318 can be stored within zone coordinator 308. In some embodiments, active node table 316 is part of a zone bus datalink 314 (e.g., a MSTP datalink) used by the zone coordinator 308 to communicate via zone bus 318. Zone coordinator 308 can subscribe to changes in value of active node table 316 and can receive a notification (e.g., from zone bus datalink 314) when a change in active node table 316 occurs. In response to a notification that a change to active node table 316 has occurred, zone coordinator 308 can read active node table 316 to identify the devices connected to zone bus 318.

In some embodiments, a detector object 312 of zone coordinator 308 generates a list of the devices communicating on zone bus 318 (i.e., a device list) based on active node table 316 and stores the device list within zone coordinator 308. Each zone coordinator in BMS 200 can generate a list of devices on the connected zone bus. The device list generated by each zone coordinator 308 can include information about each device connected to zone bus 318 (e.g., device type, device model, device ID, MAC address, device attributes, etc.). When a new device is detected on zone bus 318, the connected zone coordinator 308 can automatically retrieve the equipment model from the device if the device stores its own equipment model. If the device does not store its own equipment model, the connected zone coordinator 308 can retrieve a list of point values provided by the device.

Zone coordinator 308 can incorporate the new zone bus device into the zoning logic and can inform system manager 202 that a new zone bus device has been added. For example, zone coordinator 308 is shown providing a field device list to system manager 202. The field device list can include a list of devices connected to zone bus 318 and/or SA bus 266. System manager 202 can use the field device list and the list of system bus devices to generate a device tree including all of the devices in BMS 200. In some embodiments, zone coordinator 308 provides an equipment model for a connected zone bus device to system manager 202. System manager 202 can then use the equipment model and/or list of point values for the new zone bus device to present information about the new zone bus device to a user.

In some embodiments, the device list generated by each zone coordinator 308 indicates whether system manager 202 should communicate directly with the listed zone bus device (e.g., VAV RTU 222, VAV zone controller 224, etc.) or whether system manager 202 should communicate with the intermediate zone coordinator 308 on behalf of the zone bus device. In some embodiments, system manager 202 communicates directly with zone bus devices that provide their own equipment models, but communicates with the intermediate zone coordinator 308 for zone bus devices that do not provide their own equipment model. As discussed above, the equipment models for zone bus devices that do not provide their own equipment model can be generated by the connected zone coordinator 308 and stored within the zone coordinator 308. Accordingly, system manager 202 may communicate directly with the device that stores the equipment model for a connected zone bus device (i.e., the zone bus device itself or the connected zone coordinator 308).

The active node table 330 for SA bus 266 can be stored within zone controller 322. In some embodiments, active node table 330 is part of the SA bus datalink 328 (e.g., a MSTP datalink) used by zone controller 322 to communicate via SA bus 266. Zone controller 322 can subscribe to changes in value of the active node table 330 and can receive a notification (e.g., from SA bus datalink 328) when a change in active node table 330 occurs. In response to a notification that a change to active node table 330 has occurred, zone controller 322 can read active node table 330 to identify some or all of the devices connected to SA bus 266. In some embodiments, active node table 330 identifies only the SA bus devices participating in the token passing ring via SA bus 266 (e.g., MSTP master devices). Zone controller 322 can include an additional net sensor plug and play (NsPnP) 324 configured to detect SA bus devices that do not participate in the token passing ring (e.g., MSTP slave devices).

In some embodiments, NsPnP 324 is configured to actively search for devices connected to SA bus 266 (e.g., networked sensors 238, actuators 332, lighting controllers 334, etc.). For example, NsPnP 324 can send a "ping" to a preconfigured list of MSTP slave MAC addresses. For each SA bus device that is discovered (i.e. responds to the ping), NsPnP 324 can dynamically bring it online. NsPnP 324 can bring a device online by creating and storing an instance of a SA bus device object representing the discovered SA bus device. NsPnP 324 can automatically populate the SA bus device object with all child point objects needed to collect and store point data (e.g., sensor data) from the newly-discovered SA bus device. In some embodiments, NsPnP 324 automatically maps the child point objects of the SA bus device object to attributes of the equipment model for zone controller 322. Accordingly, the data points provided by the SA bus devices can be exposed to zone coordinator 308 and other devices in BMS 200 as attributes of the equipment model for zone controller 322.

In some embodiments, a detector object 326 of zone controller 322 generates a list of the devices connected to SA bus 266 (i.e., a device list) based on active node table 330 and stores the device list within zone controller 322. NsPnP 324 can update the device list to include any SA bus devices discovered by NsPnP 324. The device list generated by zone controller 322 can include information about each device connected to SA bus 266 (e.g., device type, device model, device ID, MAC address, device attributes, etc.). When a new device is detected on SA bus 266, zone controller 322 can automatically retrieve the equipment model from the device if the device stores its own equipment model. If the device does not store its own equipment model, zone controller 322 can retrieve a list of point values provided by the device.

Zone controller 322 can incorporate the new SA bus device into the zone control logic and can inform zone coordinator 308 that a new SA bus device has been added. Zone coordinator 308 can then inform system manager 202 that a new SA bus device has been added. For example, zone controller 322 is shown providing a SA device list to zone coordinator 308. The SA device list can include a list of devices connected to SA bus 266. Zone coordinator 308 can use the SA device list and the detected zone bus devices to generate the field device list provided to system manager 202. In some embodiments, zone controller 322 provides an equipment model for a connected SA bus device to zone coordinator 308, which can be forwarded to system manager 202. System manager 202 can then use the equipment model and/or list of point values for the new SA bus device to present information about the new SA bus device to a user. In some embodiments, data points provided by the SA bus device are shown as attributes of the zone controller 322 to which the SA bus device is connected.

Additional features and advantages of BMS 200, system manager 202, zone coordinator 308, and zone controller 322 are described in detail in U.S. patent application Ser. No. 15/179,894 filed Jun. 10, 2016, the entire disclosure of which is incorporated by reference herein.

Network Connections

Figure 4:
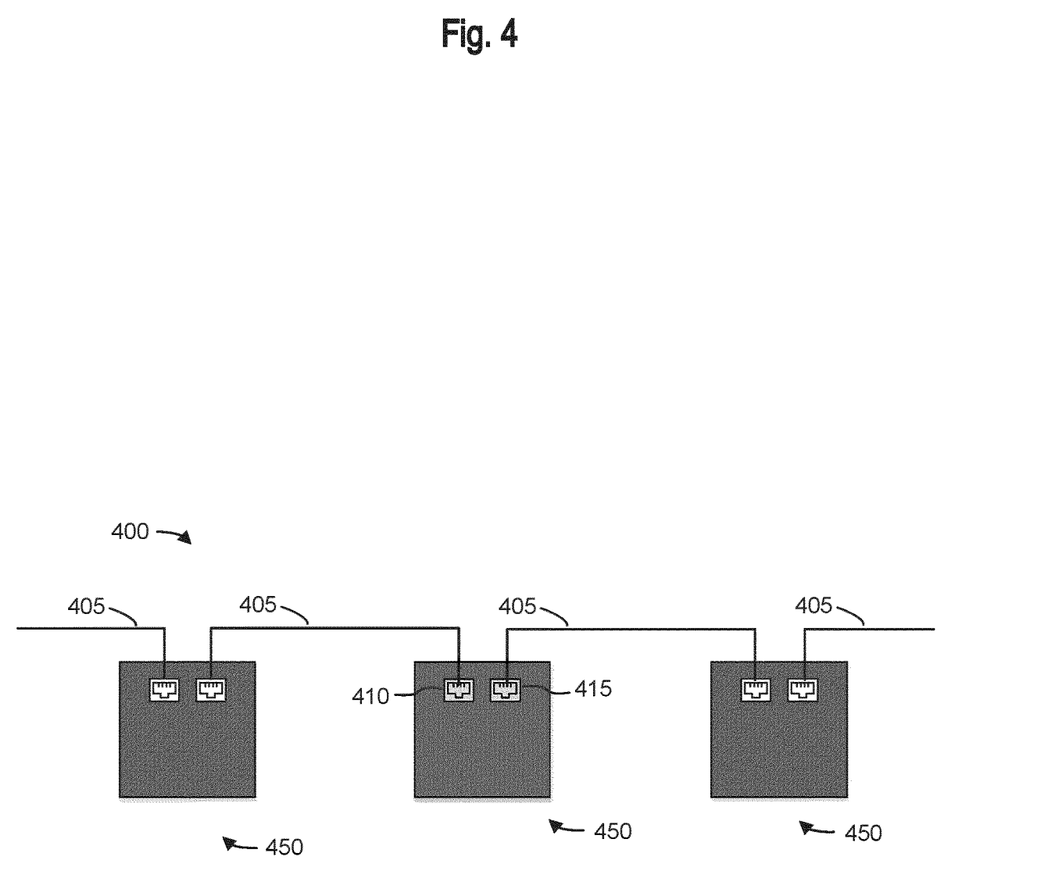
FIG. 4 is a block diagram of a network of controllers in communication with each other for use in the systems of FIG. 1 or 2.

Referring now to FIG. 4, a system 400 includes a number of controllers 450 (e.g., IP controllers), connectors 410, 415 (Ethernet jacks) and wiring or cables 405 (Ethernet cables) according to an exemplary embodiment. The system 400 can be or be part of system 100 of the building 10 of FIG. 1 and/or implemented in the BMS 200 as described with reference to FIGS. 2-3. Controllers 450 can be any type of HVAC, security, lighting, safety, or network equipment that communicates via a wired network in some embodiments. In addition, controllers 450 can be non-HVAC equipment, such as any network device.

The cables 405 link the individual controllers 450 in a daisy chain configuration in some embodiments. In some embodiments, each of controllers 450 includes connectors 410 and 415 where a connector 410 is coupled to an upstream controller and a connector 415 is coupled to a downstream controller. Controllers 450 are configured to provide a bypass which allows other controllers 450 to remain communicative in the event of a single or multi point controller power failure or other event that prevents a controller 450 from being communicative in some embodiments. The Ethernet system 400 may be part of data communications link 374 as described above.

Figure 5:
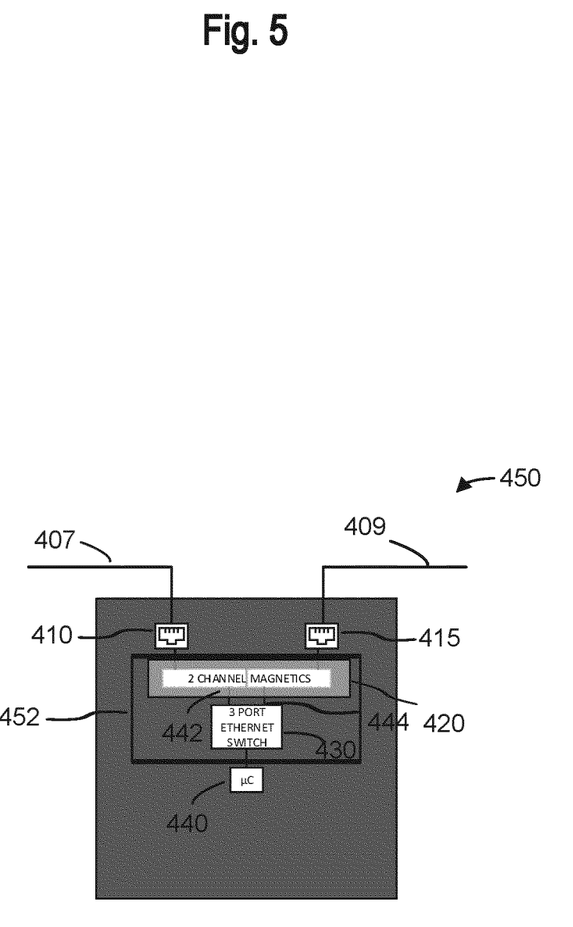
FIG. 5 is a more detailed block diagram of one of the controllers of FIG. 4.

Referring now to FIG. 5, the controller 450 of FIG. 4 includes a switch unit 452, a microcontroller 440 and connectors 410 and 415. According to an exemplary embodiment, an end of a first cable 407 (similar to cable 405 (FIG. 4)) connects to controller 450 via connector 410. Another cable 409 (similar to cable 405 (FIG. 4)) connects to connector 415 on the controller 450. Connectors 410, 415 are each connected to switch unit 452.

Switch unit 452 is a three port Ethernet-type switch unit in some embodiments. The first two ports are coupled to connectors 410 and 415, respectively, and a third port is coupled to microcontroller 440. Microcontroller 440 can be any type of processor, communication controller, microprocessor, and is part of controller 450 in some embodiments. Microcontroller 440 can control communication operations as well as HVAC operations in some embodiments. In some embodiments, switch unit 452 controls communication operations with or without contributions from microcontroller 440.

In some embodiments, switch unit 452 includes a magnetic circuit 420, and a switch 430 (e.g., three port Ethernet switch). Magnetic circuit 420 is a two channel magnetic circuit within controller 450. In some embodiments, the magnetic circuit 420 may be integrated on microcontroller 440, disposed in between connectors 410, 415 and microcontroller 440, integrated with network switch 430, integrated with connectors 410 and 415 or otherwise disposed to provide a bypass path. In some embodiments, magnetic circuit 420 is configured to connect connectors 410 and 415 to each other when microcontroller 440 cannot participate in communications (e.g., due to a power outage) and is configured to connect connectors 410 and 415 to first and second ports 442 and 444, respectively, of switch 430 and ultimately microcontroller 440 in some embodiments.

Switch 430 and/or microcontroller 440 can include circuitry for processing, relaying, storing, transmitting and receiving signals on cable 405. Physical layer operations, media access control functions and network processing can be performed by switch 430 and/or microcontroller 440 in some embodiments. Microcontroller 440 can also provide HVAC or other BMS functions for controller 450.

In some embodiments, magnetic circuit 420 is a switch circuit that uses solid state switches or micro relay switches to provide a bypass circuit instead of a magnetic components. In such an embodiment, the solid state switches or relay switches bypass switch 430 and connect connectors 410 and 415 in the event of a power failure.

Figure 6:
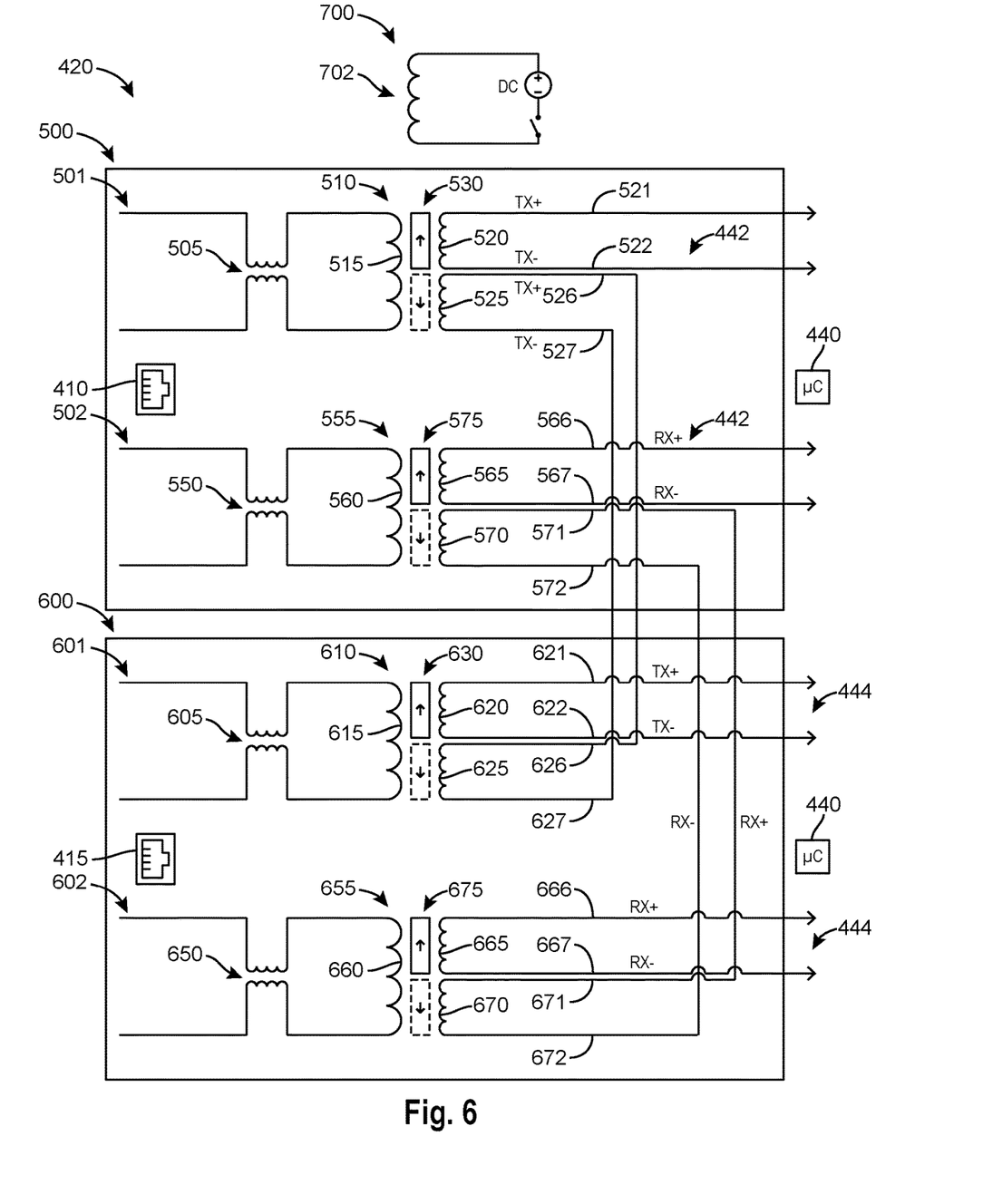
FIG. 6 is an electrical schematic drawing of the magnetic circuit of the controller of FIG. 5.

Referring now to FIG. 6, the magnetic circuit 420 of controller 450 includes magnetics channels 500 and 600 and a coil control circuit 700. Connector 410 on controller 450 is coupled to a first magnetics channel 500. The connector 415 of controller 450 is coupled to a second magnetics channel 600. In some embodiments, magnetic circuit 420 may be integrated on microcontroller 440, disposed in between connectors 410, 415 and microcontroller 440, is integrated with network switch 430, is integrated with connectors 410 and 415 or otherwise disposed to provide a bypass path. In some embodiments, the first magnetics channel 500 may be identical to or similar to the second magnetics channel 600. In some embodiments, magnetics channels 500, 600 of the same controller 450 lead to the same switch 430 and the same microcontroller 440.

According to the exemplary embodiment, the first magnetics channel 500 contains a first set 501 of transformer circuits. The first transformer circuit set 501 comprises: a first transformer 505 and a second transformer 510. The second transformer 510 comprises: wire coils or windings 515, 520, and 525 and a ferrous half core 530 positioned between winding 515 and windings 520, 525. In some embodiments, windings 520 and 525 may be positioned proximate one another. Winding 515 may be considered to be a primary coil and windings 520, 525 may be considered to be first and second secondary coils, respectively, according to some embodiments.

The first magnetics channel 500 also contains a second set 502 of transformer circuits. The second transformer circuit set 502 comprises: a first transformer 550 and a second transformer 555. The second transformer 555 comprises: wire coils or windings 560, 565, and 570 and a ferrous half core 575 positioned between winding 560 and windings 565, 570. In some embodiments, windings 565 and 570 may be positioned proximate one another. Winding 560 may be considered to be a primary coil and windings 565, 570 may be considered to be first and second secondary coils, respectively, according to some embodiments. Windings 565 and 520 are coupled to port 442 in some embodiments.

In some embodiments, the second magnetics channel 600 may be identical to the components described as being present in first magnetics channel 500. The second magnetics channel 600 contains a first set 601 of transformer circuits. The first transformer circuit set 601 comprises: a first transformer 605 and a second transformer 610. The second transformer 610 comprises: wire coils or windings 615, 620, and 625 and a ferrous half core 630 positioned between winding 615 and windings 620, 625. In some embodiments, windings 620 and 625 may be positioned proximate one another. Winding 615 may be considered to be a primary coil and windings 620, 625 may be considered to be first and second secondary coils, respectively, according to some embodiments.

The second magnetics channel 600 also contains a second set of transformer circuits 602. The second transformer circuit set comprises: a first transformer 650 and a second transformer 655. The second transformer 655 comprises: wire coils or windings 660, 665, and 670 and a ferrous half core 675 positioned between winding 660 and windings 665, 670. In some embodiments, windings 665 and 670 may be positioned proximate one another. Winding 660 may be considered to be a primary coil and windings 665, 670 may be considered to be first and second secondary coils, respectively, according to some embodiments. Windings 665 and 620 are coupled to port 444 in some embodiments. Transformers 505, 550, 605, and 650 provide filtering and are optional.

In some embodiments, magnetics channels 500, 600 may contain a number of transformer circuits depending on the quantity of data and connections. For example, magnetics channels 500, 600 may contain four sets of transformer circuits for a data quantity greater than one gigabit.

In some embodiments, a first end 521 of winding 520 extends out of the first magnetics channel 500 toward switch 430 and/or microcontroller 440. A second end 522 of winding 520 extends out of the first magnetics channel 500 toward switch 430 and/or microcontroller 440.

In some embodiments, a first end 526 of winding 525 extends out of the first magnetics channel 500 and is coupled to a first ending 626 of winding 625 of transformer 610. A second end 527 of winding 525 extends out of the first magnetics channel 500 and is coupled to a second ending 627 of winding 625 of transformer 610. In other embodiments, the first and second endings 526, 527 of winding 525 may not be coupled to the first and second endings 626, 627 of winding 625. In other embodiments still, the first and second endings 526, 527 of windings 525 may extend out of the first magnetics channel 500 toward 3 port Ethernet switch 430 and/or microcontroller 440.

In some embodiments, first end 566 of winding 565 extends out of the first magnetics channel 500 toward 3 port Ethernet switch 430 and/or microcontroller 440. A second end 567 of winding 565 extends out of the first magnetics channel 500 toward 3 port Ethernet switch 430 and/or microcontroller 440.

In some embodiments, a first end 571 of winding 570 extends out of the first magnetics channel 500 and is coupled to a first ending 671 of winding 670 of transformer 610. A second end 572 of winding 570 extends out of the first magnetics channel 500 and is coupled to a second ending 672 of winding 670 of transformer 610. In other embodiments, the first and second endings 571, 572 of winding 570 may not be coupled to the first and second endings 671, 672 of winding 670. In other embodiments still, the first and second endings 571, 572 of windings 570 may extend out of the first magnetics channel 500 toward switch 430 and/or microcontroller 440.

In some embodiments, first end 621 of winding 620 extends out of the first magnetics channel 600 toward 3 port Ethernet switch 430 and/or microcontroller 440. A second end 622 of winding 620 extends out of the first magnetics channel 600 toward switch 430 and/or microcontroller 440.

In some embodiments, first end 666 of winding 665 extends out of the first magnetics channel 600 toward switch 430 and/or microcontroller 440. A second end 667 of winding 665 extends out of the first magnetics channel 600 toward switch 430 and/or microcontroller 440.

Magnetic circuit 420 also includes coil control circuit 700. In some embodiments, coil control circuit 700 includes a switching coil 702 in an on or closed position. In other embodiments, switching coil 702 is in an off or open position. Further description of the operation of switching coil 702 is described herein. Coil control circuit 700 is controlled by signals from switch 430 or microcontroller 440.

Figure 7:
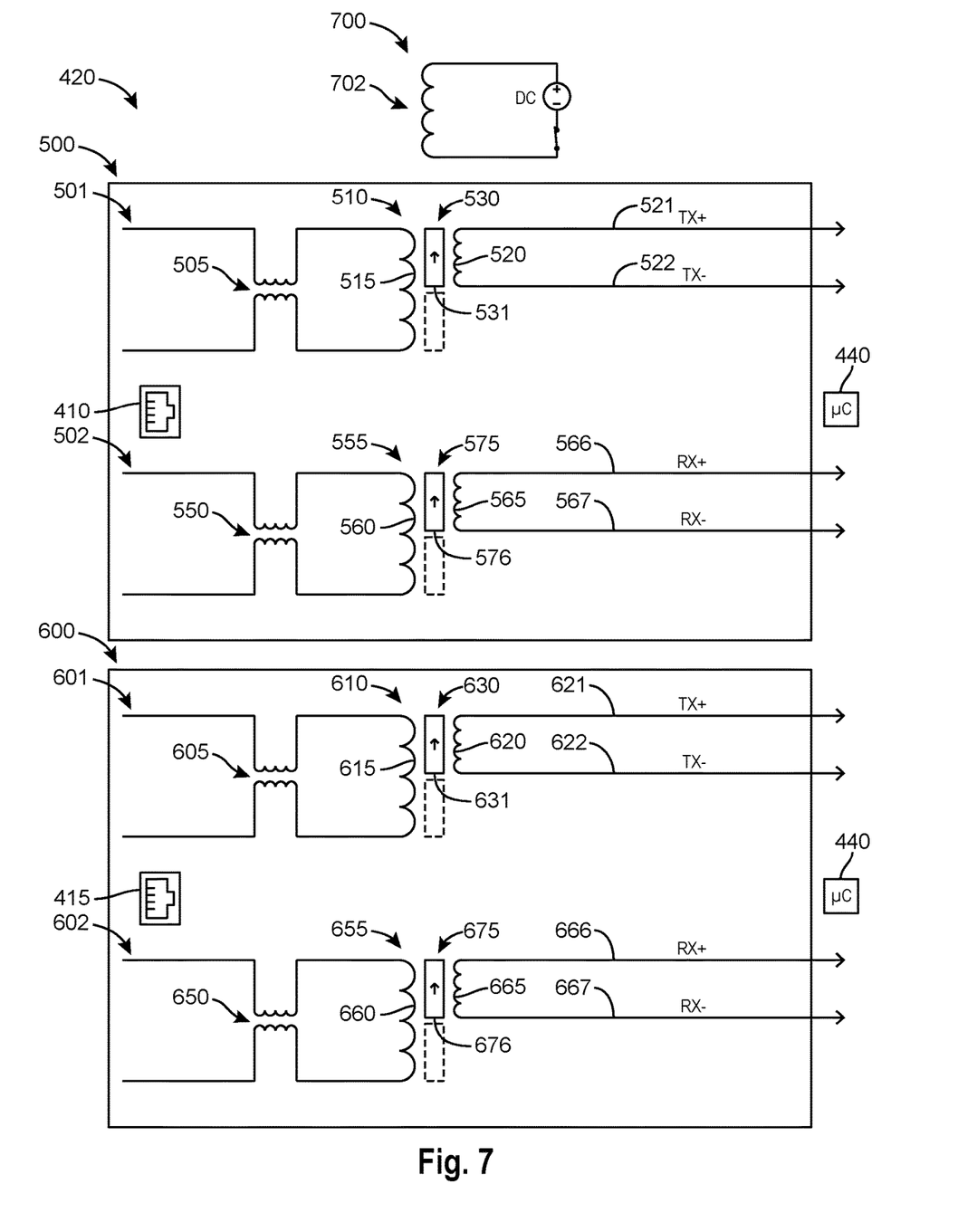
FIG. 7 is an electrical schematic drawing of the magnetic circuit of the controller of FIG. 5.

Referring now to FIG. 7, a first configuration of the magnetic circuit 420 is shown. According to this exemplary embodiment, switching coil 702 is in an energized or non-energized state. According to the exemplary embodiment, coil control circuit 700 is supplying power to control switching coil 702 this embodiment, ferrous half cores 530, 575, 630, 675 are in up positions 531, 576, 631, 676, respectively.

According to the embodiment shown in FIG. 7, first ends 521, 566, 621, 666 and second ends 522, 567, 622, 667 of windings 520, 565, 620, 665, respectively, may all be active and extend out to switch 430 and/or microcontroller 440 and may deliver a signal to switch 430 and/or microcontroller 440. FIG. 7 is an exemplary embodiment of the system 400 operating under normal conditions.

Figure 8:
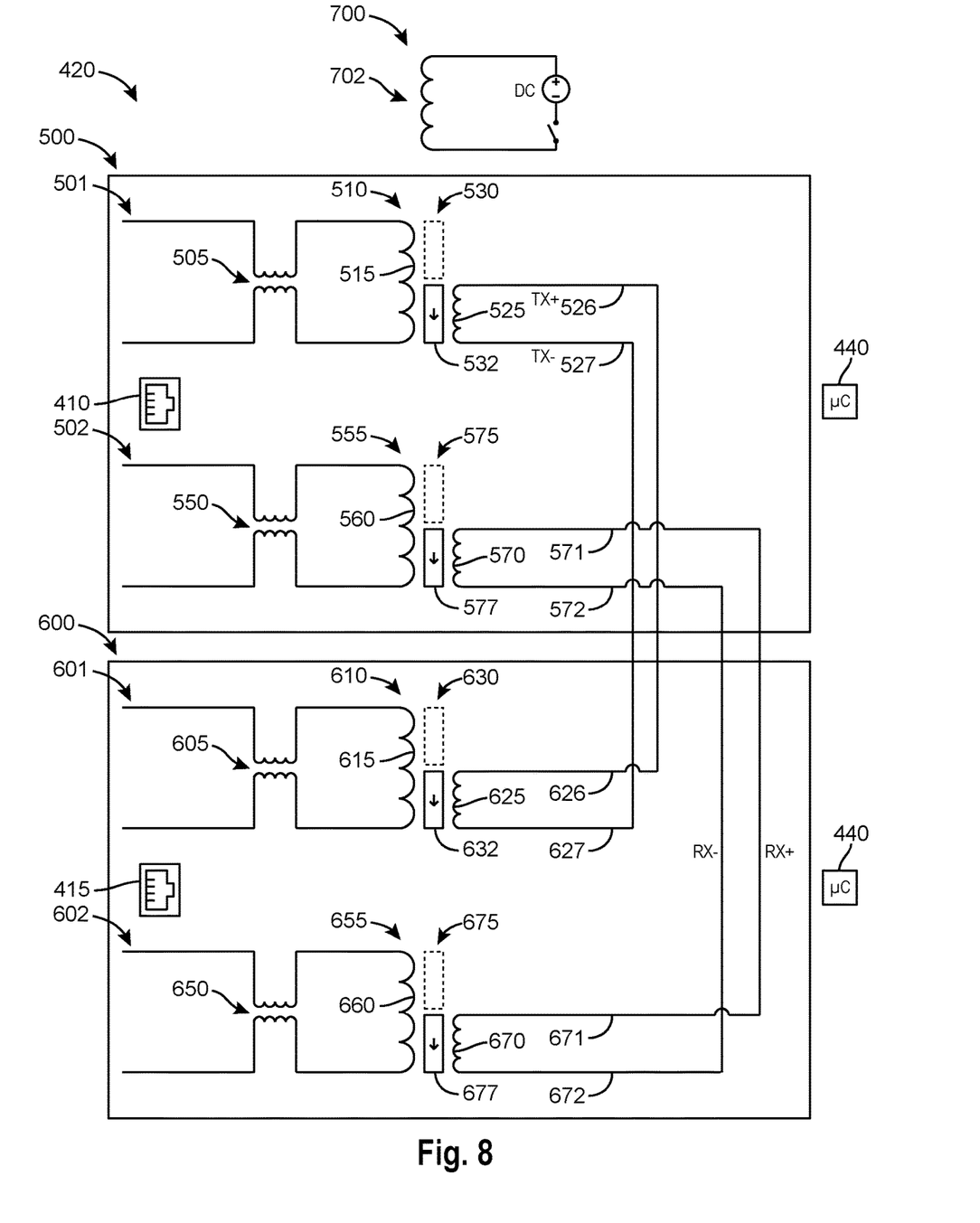
FIG. 8 is an electrical schematic drawing of the magnetic circuit of the controller of FIG. 5.

Referring now to FIG. 8, a second configuration of the magnetic circuit 420 is shown. According to this exemplary embodiment, switching coil 702 is not energized. In this embodiment, ferrous half cores 530, 575, 630, 675 are in down position 532, 577, 631, and 677, respectively. Cores 539, 575, 639, and 675 are biased in the down position by gravity or a bias (e.g., a spring). In some embodiments, coil control circuit 700 is automatically depowered when microcontroller 440 loses power because the circuit 700 and microcontroller share the same power supply. In some embodiments, microcontroller 440 provides a control signal to control current through coil 702 such that coil is de-energized when microcontroller 440 or switch unit 452 (FIG. 4) cannot participate in communications.

When the switching coil 702 is not energized, first windings 520, 565, 620, 665, first ends 521, 566, 621, 666, and second ends 522, 567, 622, 667 are no longer active or communicating with switch 430 and/or microprocessor or microcontroller 440. In some embodiments, this may be caused by a single or multi-point power failure.

When ferrous half cores 530, 575, 630, and 675 are in the down positions 532, 577, 631, 677, respectively, second winding or coil 525 is linked to second winding 625 and second winding or coil 570 is linked to second winding 670. Second winding 525 is linked to second winding 625 via first ends 526, 626, and second ends 527,627. Second winding 570 is linked to second winding 670 via first ends 571, 671 and second ends 572, 672. According to the exemplary embodiment, first end 526 may be considered to be the same as first ending 626, first end 571 may be considered to be the same as first ending 671, second ending 527 may be considered to be the same as second ending 627 and second ending 572 may be considered to be the same as second ending 672.

In some embodiments, switching coil 702 is responsible for the movement of any of the ferrous half cores 530, 575, 630, 675 from the up position to the down position or vice versa. According to the exemplary embodiment, the presence of the two secondary coils of each second transformer 510, 555, 610, 655 causes a magnetic field created by each second transformer 510, 555, 610, 655 to move from the first secondary coil to the second secondary coil in each transformer 510, 555, 610, 655. Therefore, each second secondary coil 525, 570 626, 670 may be coupled to the ferrous half core in down positions 532, 577, 632, 677, respectively so that the magnetic circuit 420 of controller 450 may still function in the event of a power failure.

According to the exemplary embodiment shown in FIG. 8, the systems or channels 500, 600 are coupled in such a way that a signal can be communicated and continue to traverse the daisy chain of controllers 450. For example, if a single controller 450 experiences a power failure, the coupling of secondary coils 525 to 626 and 570 to 670 creates a coupling of systems or channels 500 and 600, according to an exemplary embodiment. Furthermore, cables 405 plugged into connectors 410, 415 connect the controller 450 that experienced the power failure to two additional controllers 450 that have not experienced a power failure. Hence, the controller 450 that has experienced a power failure remains able to communicate necessary data to a switch 430, a microcontroller 440, or any other necessary components not described herein.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Inputs and outputs can be differential, single ended, paired, etc.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A communication switch comprising:
    a first magnetic circuit having a first movable core, a first transmit output coupled with a first connector, a first transmit input, and second transmit input;
    a second magnetic circuit having a second movable core, a first receive input coupled with the first connector, a first receive output, and second receive output;
    a third magnetic circuit having a second transmit output coupled with a second connector, a third transmit input, and fourth transmit input, the fourth transmit input coupled with the second transmit input, the first transmit input and the third transmit input coupled with a controller; and
    a fourth magnetic circuit having a second receive input coupled with the second connector, a third receive output, and a fourth receive output, the fourth receive output coupled with the second receive output, the first receive output and the third receive output coupled with the controller;
    wherein the first transmit output is coupled to the first transmit input by the first movable core and the first receive output is coupled to the first receive input by the second movable core in a first condition, and wherein the first transmit output is coupled to the second transmit input by the first movable core and the first receive input is coupled to the second receive output by the second movable core in a second condition.

2. The communication switch of claim 1, wherein the second condition is power loss in the controller.

3. The communication switch of claim 2, wherein the first transmit output and the first receive input are coupled to a first Ethernet jack.

4. The communication switch of claim 3, wherein the second transmit output and the second receive input are coupled to a second Ethernet jack.

5. The communication switch of claim 3, wherein the third magnetic circuit comprises a third movable core, and the fourth magnetic circuit comprises a fourth movable core;
wherein the second transmit output is coupled to the third transmit input by the third movable core and the third receive output is coupled to the second receive input by the fourth movable core in the first condition, and wherein the second transmit output is coupled to the fourth transmit input by the third movable core and the second receive input is coupled to the fourth receive output by the fourth movable core in the second condition.

6. The communication switch of claim 5, wherein the first magnetic circuit comprises a transformer including the first movable core, the second magnetic circuit comprises a second transformer including the second movable core, the third magnetic circuit comprises a third transformer including the third movable core, and the fourth magnetic circuit comprises a fourth transformer including the fourth movable core.

7. The communication switch of claim 3, wherein the communication switch is a three port Ethernet switch.

8. A communication switch for use in a building, the communication switch comprising:
a first circuit having a first transmit output coupled with a first connector, a first transmit input, and second transmit input;
a second circuit having a first receive input coupled with the first connector, a first receive output, and second receive output;
a third circuit having a second transmit output coupled with a second connector, a third transmit input, and fourth transmit input, the fourth transmit input coupled with the second transmit input, the first transmit input and the third transmit input coupled with a controller; and
a fourth circuit having a second receive input coupled with the second connector, a third receive output, and a fourth receive output, the fourth receive output coupled with the second receive output, the first receive output and the third receive output coupled with the controller;
wherein the first transmit output is coupled to the first transmit input by a first movable core and the first receive output is coupled to the first receive input by a second movable core in a first condition, and wherein the first transmit output is coupled to the second transmit input by the first movable core and the first receive input is coupled to the second receive output by the second movable core in a second condition.

9. The communication switch of claim 8, wherein the second condition is power loss in the controller.

10. The communication switch of claim 8, wherein the first transmit output and the first receive input are coupled to a first Ethernet jack.

11. The communication switch of claim 8, wherein the second transmit output and the second receive input are coupled to a second Ethernet jack.

12. The communication switch of claim 8, wherein the second transmit output is coupled to the third transmit input by a third movable core and the third receive output is coupled to the second receive input by a fourth movable core in the first condition, and wherein the second transmit output is coupled to the fourth transmit input by the third movable core and the second receive input is coupled to the fourth receive output by the fourth movable core.

13. The communication switch of claim 12, wherein the first circuit comprises a first transformer including the first movable core, the second circuit comprises a second transformer including the second movable core, the third circuit comprises a third transformer including the third movable core, and the fourth circuit comprises a fourth transformer including the fourth movable core.

14. The communication switch of claim 8, wherein the communication switch is a three port Ethernet switch.

15. A communication switch for use in an Ethernet network, the communication switch comprising:
a first circuit having a first core, a first transmit output coupled with a first connector, a first transmit input, and second transmit input;
a second circuit having a second core, a first receive input coupled with the first connector, a first receive output, and second receive output;
a third circuit having a second transmit output coupled with a second connector, a third transmit input, and fourth transmit input, the fourth transmit input coupled with the second transmit input, the first transmit input and the third transmit input coupled with a controller; and
a fourth circuit having a second receive input coupled with the second connector, a third receive output, and a fourth receive output, the fourth receive output coupled with the second receive output, the first receive output and the third receive output coupled with the controller;
wherein the first transmit output is coupled to the first transmit input and the first receive output is coupled to the first receive input in a first condition by an action of a control circuit, and wherein the first transmit output is coupled to the second transmit input and the first receive input is coupled to the second receive output in a second condition by the action of the control circuit, wherein the action comprises energizing or deenergizing a coil to move the first core and the second core.

16. The communication switch of claim 15, wherein the second condition is power loss in the controller.

17. The communication switch of claim 15, wherein the first transmit output and the first receive input are coupled to a first Ethernet jack.

18. The communication switch of claim 15, wherein the second transmit output and the second receive input are coupled to a second Ethernet jack.

19. The communication switch of claim 15, wherein the third circuit comprises a third core, and the fourth circuit comprises a fourth core;
wherein the second transmit output is coupled to the third transmit input and the third receive output is coupled to the second receive input in the first condition by the action of the control circuit, and wherein the second transmit output is coupled to the fourth transmit input and the second receive input is coupled to the fourth receive output in the second condition by the action of the control circuit.

20. The communication switch of claim 19, wherein the first circuit, the second circuit, the third circuit, and the fourth circuit each comprise a transformer including one of the first core, the second core, or the third core.

* * * * *